Feb. 8, 1966  G. VENCA  3,233,590
METHOD AND APPARATUS FOR FEEDING GERMINATED GRAIN
Filed Jan. 27, 1964  3 Sheets-Sheet 1
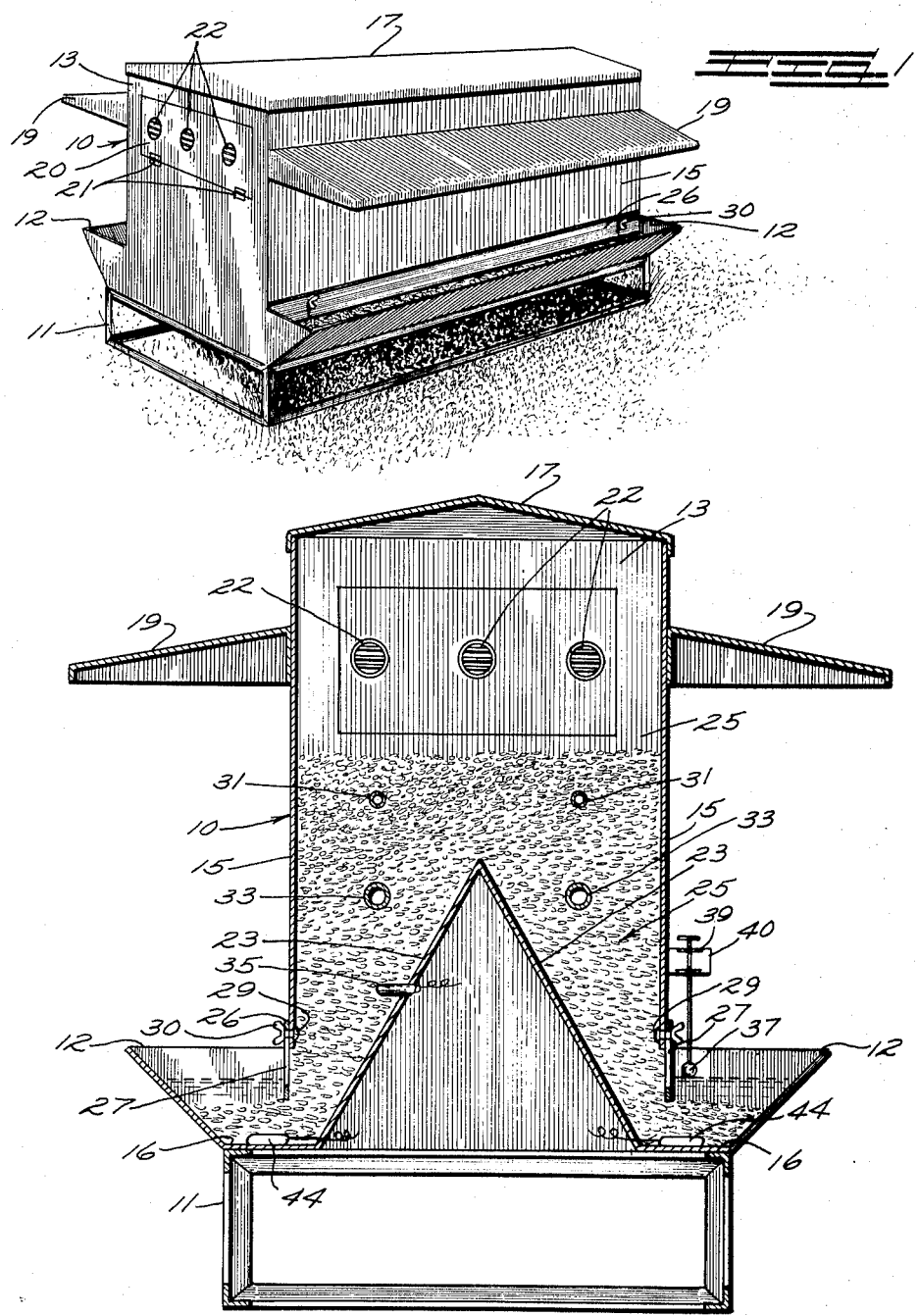
INVENTOR.
George Venca
BY
ATTORNEYS

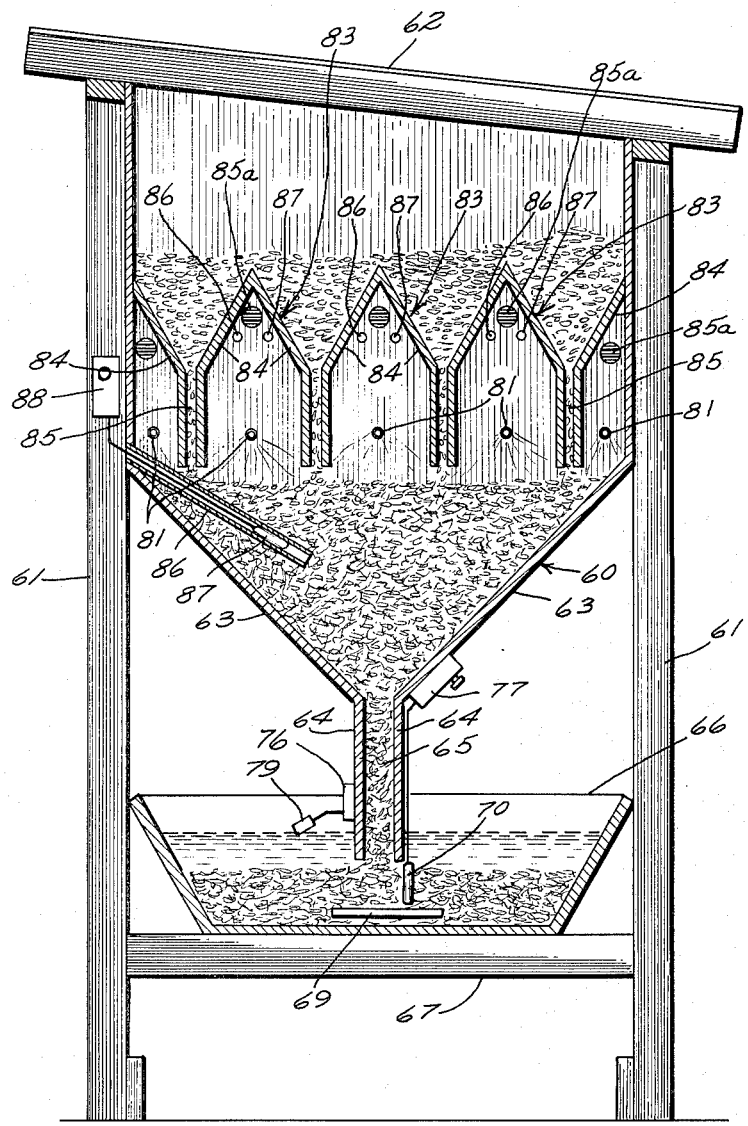

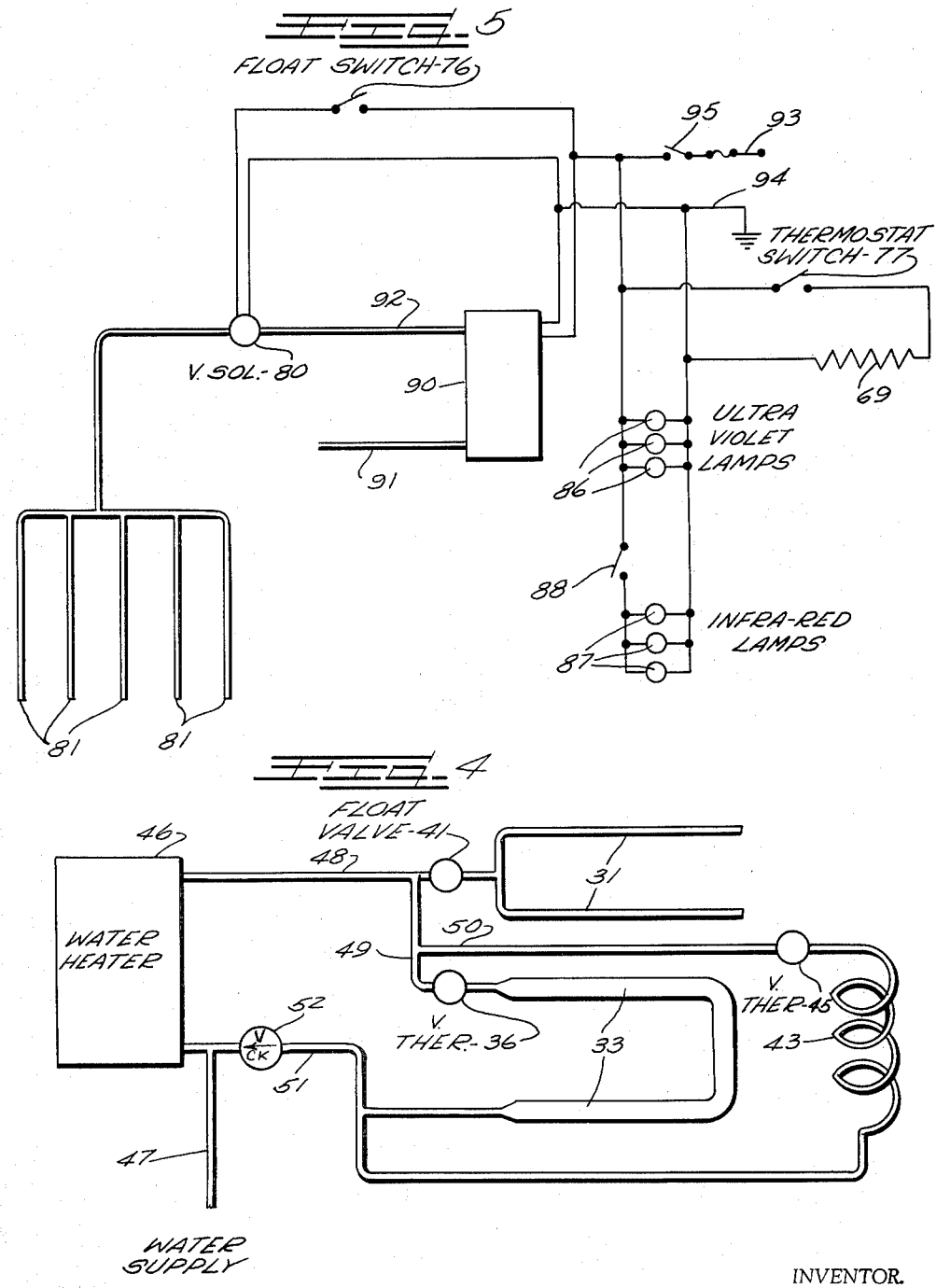

United States Patent Office 3,233,590
Patented Feb. 8, 1966

3,233,590
METHOD AND APPARATUS FOR FEEDING GERMINATED GRAIN
George Venca, 208 S. La Salle St., Suite 1037, Chicago, Ill.
Filed Jan. 27, 1964, Ser. No. 340,182
13 Claims. (Cl. 119—51.5)

This invention relates to an improved germinating apparatus germinating feed and water for feeding and watering animals and fowl.

A principal object of the present invention is to provide a new and improved apparatus for feeding and watering animals and fowl, arranged with a view toward increasing the food value of the food, reducing disease and reducing the labor required to feed the animals.

A further object of the invention is to provide an apparatus for feeding animals and fowl in which the grain to be fed the animals is first germinated and the germinated grain is supplied in water to both feed and water the animals or fowl.

A still further object of the invention is to provide an improved form of germinator for grain and the like, used as a feeder for animals and fowl, and providing nutritious drinking water and living food with a resultant improvement in the health of the animal or fowl.

A still further object of the invention is to provide an apparatus for feeding animals and the like including a hopper containing grain to be fed to the animals, spray means and heating means for supplying water and heat to a layer of grain to effect germination thereof and a feeding trough at the lower end of the hopper supplied with germinating grain and water.

A still further object of the invention is to provide an improved form of germinating apparatus supplying germinating grain and water for animals and the like, including a hopper terminating at its lower end into a feeding trough with sprays at an intermediate level of the hopper, for maintaining the grain moist and heating means in the moist grain maintaining the grain at a temperature conducive to germination together with control means for the sprays, shutting off the sprays in accordance with a selected depth of water in the feeding trough.

A still further object of the invention is to provide an apparatus for feeding animals and the like germinated grain and water in which the grain is germinated at a lower level thereof by the supply of water and heat thereto and in which an automatic control means is provided for maintaining the germinated grain at a predetermined temperature and moisture content conducive to germination and maintaining the level of water in the feeding trough at a selected level and at a desired temperature.

These and other objects of the invention will appear from time to time as the following specification proceeds and with reference to the accompanying drawings wherein:

FIGURE 1 is a perspective view of a germinating grain feeder constructed in accordance with the principles of the present invention;

FIGURE 2 is a transverse sectional view taken through the feeder shown in FIGURE 1;

FIGURE 3 is a transverse sectional view taken through a modified form of feeder constructed in accordance with the principles of the present invention;

FIGURE 4 is a fluid circuit for an apparatus like that shown in FIGURE 1; and

FIGURE 5 is a wiring diagram and fluid circuit for an apparatus like that shown in FIGURE 1 or FIGURE 3.

In the embodiment of the invention illustrated in the drawing, I have shown in FIGURES 1 and 2 a shed 10 supported in vertically spaced relation with respect to the ground on a stand 11, elevating feeding troughs 12, 12 extending along opposite sides of said shed to a height convenient for feeding. The shed 10 has opposite end walls 13, 13 side walls 15, 15 connecting said end walls together and stopping short of bottoms 16, 16 for the feeding trough, to provide passageways for grain and water to said feeding troughs. The shed 10 also has a top 17 which may be removable or hinged, to accommodate the loading of said hopper with grain, and has hoods or protective roof sections 19, 19 extending along opposite sides thereof over the feeding troughs 12, to protect the animals from the elements, and also to protect the grain in said feeding troughs. One end wall 13 has an inspection and maintenance access door 20, hinged thereto as by hinges 21 and forming a means for inspecting the inside of the shed and the mechanism therein, and for maintaining the mechanism when required. The door 20 has air vents 22 therein, which may be adjustable to adjust the flow of air through the shed. The opposite end wall 13 has air vents 22 therein, which may be like the air vents 22.

The shed also has sloping bottom walls 23 sloping inwardly and upwardly from the bottom walls 16 of the feeding troughs 12, and terminating at the center of the shed into a peak, and with the end walls 13, 13 and side walls 15, 15 forming a divided germinating hopper 25, supplying grain to the feeding troughs 12, 12 along the spaces beneath the bottoms of the side walls 15, 15.

Each side wall 15 has an adjustable baffle plate 26 forming a downward continuation thereof and vertically adjustable with respect to the associated side wall to vary the flow rate of grain to the associated feeding trough 12. As shown in FIGURE 2, the baffle plates 26 have spaced slots 27 extending vertically therealong, through which extend bolts 29, forming slidable supports therefor. Wing nuts 30 threaded on said bolts form a means for adjustably holding baffles in position.

The shed 10 may be made from wood, metal or an insulating material and the walls and roof of the shed may of themselves be insulated, where not made from an insulating material. The insulation of the shed may be in any conventional manner and is no part of the present invention, so need not herein be shown or described. Also, while the shed 10 is shown as being rectangular, it may be cylindrical or of any other desired form.

Referring now in particular to the means for germinating grain within the shed 10, a means is provided for introducing warm water in the grain in said shed, which is herein shown as comprising two parallel spaced spray tubes 31, 31 extending between the end walls 13, 13 and suitably mounted thereon. Beneath the spray tubes 31, 31 are two heater tubes 33, 33 shown as extending parallel to the spray tubes 31, 31 and shown in FIGURE 4 as having communication with each other to form in effect a single tube. The tubes 31, 31 may be disposed either above the level of grain in the hopper 25 or within the grain, it being understood that where the spray tubes are within the grain, that there will be a layer of dry grain which will not germinate until it comes in contact with the water flowing through the tubes 31, 31. The level of the heating tubes 33, 33 may also vary, said tubes being shown in FIGURE 2 as located at opposite sides of the sloping bottom 23 to maintain the grain warm as it passes downwardly to the feeding troughs 12, 12. A temperature sensitive bulb 35 is shown as being mounted in one of the sloping bottom walls 23 for sensing the temperature of the grain in the germinating hopper. The bulb 35 may have operative connection with the thermally operated valve 36, to vary the flow of hot water through the tubes 33 and maintain the temperature within the hopper 25 at a preselected temperature range, which may be in the order of 85° F.

A float 37 is shown as being mounted on one side wall 15 in a bracket 39. The float 37 may operate a switch 40, energizing a valve 41, which may be a solenoid operated valve to control the flow of warm water through the sprays 31 and to thereby determine the level of water in the feeding troughs 12. The float 37, switch 40 and valve 41 may be of any conventional form and are no part of the present invention, so need not herein be shown or described in detail.

A heating element 43 may also be provided to maintain the temperature of the grain and water in the feeding troughs 12 at a selected temperature. A heating element 43 may be in the bottom of each trough and the temperature of grain and water in the feeding troughs may be controlled by a thermally sensitive bulb 44 connected to energize the solenoid of a solenoid operated valve 45, supplying the heating element 43 with hot water in accordance with the requirement for heat in the feeding troughs 12. The heating element 43 need only be used in the winter time and is provided to maintain the water in the associated feeding trough 12 at a temperature above freezing and from 45° to 50° F. as a minimum temperature.

In FIGURE 4, I have diagrammatically shown a water heater 46 supplying warm water to the sprays 31 and to the heating elements 33 and 43.

The hot water heater 46 may either be an electric hot water heater which may be mounted on an end wall of the shed (not shown), a gas fired hot water heater, supplied with bottled gas, or an oil fired hot water heater. As shown in FIGURE 4, water at household pressure is supplied to the hot water heater 46 through a pipe 47, and hot water is conducted from the heater 46 to the valves 41, 36 and 45 through a pipe 48 and branch pipes 49 and 50. A return pipe or line 51 returns water from the heating elements 33 and 43 to the hot water heater 46. A check valve 52 may be provided in the pipe 51 upstream of the supply pipe 47 to prevent the back flow of supply water to the heating elements 33 and 43. It has been found that the pressure of the water in the supply line 47, which may be household pressure, is usually sufficient to effect the circulation of water through the heating elements 33 and 43 and to supply water through the spray pipes 31. A suitable pump, however, may be provided in cases where it is desirable to have pressures above household pressure. In large installations the water may be heated by steam in place of the conventional hot water heater. The heating elements also may be electrically energizable elements, such as resistor heaters or infra-red heating elements where feasible from a cost standpoint.

In the form of the invention shown in FIGURE 3, I have shown a germinating hopper 60 supported between longitudinally spaced vertical studs 61, 61. The hopper 60 is covered with a roof 62 which may be removable to accommodate loading of the hopper with grain, or which may be hinged for the same purpose or have a hinged door therein. The hopper 60 has opposite sloping walls 63, 63 terminating at their lower ends into spaced vertical walls 64, 64 providing a chute 65 opening at its bottom into a feeding trough 66. The feeding trough 66 is supported on cross beams 67 at a convenient height for feeding from opposite sides thereof.

A heating element 69 is diagrammatically shown in FIGURE 3 as being supported in the feeding trough 66 for maintaining the temperature of the germinated grain and water therein at a temperature above freezing, in the range of between 45 and 50 degrees in the winter time. A temperature sensitive bulb 70 extends downwardly into the feeding trough 66 and has connection with a suitable switch 77, controlling the energization of the heating element 69. The heating element 69 may be an immersion heater, electrically energized under the control of the temperature sensitive bulb 70. A float 79 is mounted on the opposite wall 64 from the temperature sensitive element 70, to control the level of water in the feeding trough 66. The float 79 serves to close a switch 76 to energize or deenergize the solenoid coil (not shown) of a solenoid operated hot water valve 80 controlling the flow of water through spaced spray pipes 81, 81, disposed above the level of grain in the hopper 60 and spraying sufficient water on the grain to maintain the grain moist and also to maintain an adequate supply of drinking water in the feeding trough 66.

Above the level of moist germinating grain in the hopper 60 are a plurality of dry grain hoppers 83 arranged in side by side relation and opening to the roof 62 to receive and supply dry grain to the moist grain in the hopper 60. The hoppers 83 each comprise inclined converging side walls 84, 84 leading to a vertically extending bottom chute 85, the bottom of which determines the level of moist grain in the hopper 60. Ventilators 85a are disposed intermediate the side walls 84 of the dry grain hoppers. The ventilators may be adjustable ventilators of a conventional form and are spaced along the hopper 60 adjacent the upper end thereof to provide the required circulation of air to promote germination of grain and avoid molding thereof. Beneath the ventilators 85 in the spaces between the converging side walls 84 are an ultra-violet ray lamp 86 and an infra-red lamp 87. The infra-red lamps provide the heat to maintain the grain at a temperature conducive to germination while the ultra-violet lamps may be provided to enhance photosynthesis and the germinating-sprouting process. Heat, however, may also be attained by conventional forms of electric heaters or by circulating hot water along the hopper through heater tubes as in the form of the invention illustrated in FIGURES 1 and 2.

In FIGURE 3 I have shown a tube 86 leading angularly downwardly into the germinating grain of the hopper 60 and having a temperature sensitive bulb 87 therein, connected with a switch 88 for controlling the energization of the infra-red lamps 87, to maintain the moist grain of the hopper 60 at a temperature conductive to germination.

In FIGURE 5, I have shown a hot water heater 90 for supplying hot water to flow through the spray pipes 81, 81 under the control of the solenoid operated valve 80, controlled by the float 79 and float switch 76. The hot water heater 90 is supplied with water through an inlet pipe 91, at household pressure, and has a hot water pipe 92 leading therefrom and having the solenoid operated valve 80 therein and supplying hot water to the spray pipes 81, 81 at the required temperature to germinate the grain, which may be in the order of 85° F. The hot water heater 90 is shown as being an electric heater although it may be an oil fired or gas fired heater as well and is energized through main line conductors 93 and 94 under the control of a manually operable switch 95.

The violet-ray lamps 86, 86 are energized through the conductors 93 and 94 upon closing of the switch 95 while the infra-red lamps are energized upon closing of the switch 95 and the thermally operated switch 88. The violet-ray lamps are thus on as long as the switch 95 is closed, while the infra-red heating lamps may go on and off to maintain the temperature within the germinating hopper 60 at the proper temperature to promote germination of the grain, which may be in the order of 85° F.

In operation of the apparatus of FIGURE 3, the germinating hoppers 83 are first filled with a suitable mixture of grain, seeds, corn, oats, soybeans, sorghum, sunflower, safflower, sesame, peanut, fenugreek and various other forms of grains and seeds which are commonly used for feeding cattle or fowl. As the hoppers 83 are filled, the grain will pass through the chutes 85 and to the germinating hopper 60 and fill said hopper to a level of the bottom of the chutes 85. The grain will also pass through the chute 65 into the feeding trough until the level of grain in the feeding trough is on a level with the bottom of the chute 65. As the germinating hopper 60 is filled with grain, the water sprays 81 are turned on to spray the grain with heated water and the infra-red tubes 87 and ultra-violet tubes 86 are also energized. It usually takes from two to three days to start the unit to function, because the sprouting area must be filled with germinated grain or grain in the process of being germinated, to prevent solid kernels from going down into the feeding trough. Once the grain is germinating and the germinating grain has passed down into the feeding trough 66 covered by water, the unit is ready to feed and water cattle and can be used indefinitely under the control of the float 79 and the temperature sensitive elements 70 and 87.

The apparatus of the form of the invention shown in FIGURES 1 and 2 operates in a manner similar to that of FIGURE 3 except that the dried grain extends over the spray tubes 31, while the germinating grain is beneath said spray tubes. This apparatus like the apparatus of FIGURE 3 is filled from the top and may be filled at any selected level below the vents 22. In this apparatus the location of the spray pipes 31 may be varied to vary the depth of the germinating grain and the dry grain, spaced thereabove as conditions require. It is, however, desirable to maintain a depth of water in the feeding trough of from four to six inches, the depth of grain in the form of the invention shown in FIGURE 2 being regulated in accordance with the positions of the baffles 27 and in the form of the invention shown in FIGURE 3 being regulated by the spacing of the bottom of the chute 65 from the bottom of the feeding trough 66.

It may be seen from the foregoing that a simple feeder for feeding animals and poultry has been provided, which is automatic in operation and eliminates grinding and mixing of the feed and besides providing germinating living food for the animals or poultry, provides nutritious drinking water.

It may further be seen that the apparatus itself may be a low cost apparatus and reduces the cost of the feed due to the increase in bulk and nutrient in the food, because of the germination of the food.

It may further be seen that the apparatus reduces the labor of feeding and can be used for long periods of time without attention.

While I have herein shown and described several forms in which the invention may be embodied, it may readily be understood that various variations and modifications in the invention may be attained without departing from the spirit and scope of the novel concepts thereof.

I claim as my invention:

1. In an apparatus for incubating and germinating seeds and supplying the germinating seeds with water for feeding, a hopper having a sloping bottom and at least one side wall spaced from said bottom, a feeding trough extending along said side wall in communication with said sloping bottom, a water spray in said hopper in vertically spaced relation with respect to said sloping bottom and supplying water to the grain therein and to said feeding trough, heating means in said hopper maintaining the grain therein at a germinating temperature, temperature sensing means for controlling the temperature of said heating means, and a float in said feeding trough controlling the flow of water through said water spray and the level of water in said feeding trough.

2. In an apparatus for incubating and germinating seeds and supplying the germinating seeds with water for feeding, a hopper having a sloping bottom and at least one side wall spaced from said bottom, a feeding trough in communication with said sloping bottom, a water spray in said hopper in vertically spaced relation with respect to said sloping bottom and supplying water to the grain therein and to said feeding trough, heating means in said hopper maintaining the grain therein at a temperature conducive to germination, temperature sensing means in said hopper controlling the temperature within said hopper, a float in said feeding trough controlling the flow of water through said water spray and the level of water in said feeding trough, heating means in said feeding trough heating the water and feed therein, and temperature sensing means controlling said heating means and the temperature of the grain and water in said feeding trough.

3. In an apparatus for incubating and germinating seeds and supplying the germinating seeds with water for feeding, a hopper having a sloping bottom and at least one side wall spaced from said bottom, a feeding trough extending along said side wall in communication with said sloping bottom, a water spray in said hopper in vertically spaced relation with respect to said sloping bottom and supplying water to the grain therein and to said feeding trough, heating means in said hopper maintaining the grain therein at a temperature conducive to germination, temperature sensing means in said hopper controlling the temperature within said hopper and the operation of said heating means, a float in said feeding trough controlling the flow of water through said water spray and the level of water in said feeding trough and a baffle adjustably mounted on said side wall for adjustable movement downwardly of said side wall toward the bottom of said feeding trough to control the flow rate of feed to said feeding trough.

4. In an apparatus for incubating and germinating seeds and supplying the germinating seeds with water for feeding, a hopper having a sloping bottom and at least one side wall spaced from said bottom, a feeding trough extending along said side wall in communication with said sloping bottom, a water spray in said hopper in vertically spaced relation with respect to said sloping bottom and supplying water to the grain therein and to said feeding trough, heating means in said hopper maintaining the grain therein at a temperature conducive to germination, temperature sensing means in said hopper controlling the temperature within said hopper and the operation of said heating means, a float in said feeding trough controlling the flow of water through said water spray and the level of water in said feeding trough and a baffle adjustably mounted on said side wall for adjustable movement downwardly of said side wall toward the bottom of said feeding trough to control the flow rate of feed to said feeding trough, heating means in said feeding trough heating the water and feed therein, and temperature sensing means in said feeding trough controlling operation of said heating means and the temperature of the feed and water in said trough.

5. In an apparatus for germinating grain and supplying germinating grain and water for feeding, a hopper for the germination of grain having a bottom sloping downwardly in opposite directions from the central peak, feeding troughs extending laterally of the lower margins of said sloping bottom, said hopper also having end walls and side walls connecting said end walls together and having lower end portions spaced vertically from the bottom of said feeding troughs forming a feed passageway from said sloping bottom to said feeding troughs, spray means in said hopper spaced above the bottom thereof supplying said hopper and feeding troughs with warm water and heating means in said hopper maintaining the temperature of said hopper to a temperature conducive to the germination of the grain therein, and float means in said feeding trough controlling the operation of said spray and the level of water in said feeding trough.

6. In an apparatus for germinating grain and supplying germinating grain and water for feeding, a hopper for the germination of grain having a bottom sloping downwardly in opposite directions from the central peak, feeding troughs extending laterally of the lower margins of said sloping bottom, said hopper also having end walls and side walls connecting said end walls together and having lower end portions spaced vertically from the bottom of said feeding troughs forming a feed passageway from said sloping bottoms to said feeding troughs, spray means in said hopper spaced above the bottom thereof supplying said hopper and feeding troughs with warm water and heating means in said hopper maintaining the temperature of said hopper to a temperature conducive to the germination of the grain therein, float means in said feeding trough controlling the operation of said spray and the level of water in said feeding trough, and baffles adjustably mounted on said side walls for adjustable movement toward and from the bottom of said feeding troughs and controlling the flow rate of germinating feed to said troughs.

7. In an apparatus for germinating grain and the like and supplying germinating grain and water for feeding animals and fowl, a hopper having end and side walls and a converging sloping bottom leading downwardly from said side walls, a chute forming a downward continuation of said sloping bottom, a feeding through disposed beneath said chute in grain and water receiving relation with respect thereto, means mounted between said side walls for supplying dry grain to said hopper comprising a plurality of hoppers arranged side by side, each having a converging bottom and a chute leading vertically therefrom and terminating at a selected grain level in said hopper, a series of water sprays extending along said hopper in the spaces between said dry grain supplying hoppers for spraying water on the grain in said germinating hopper to flow through said feeding trough, and heating elements extending along said hopper in the spaces between said dry grain supply hoppers, and disposed above said water sprays.

8. In an apparatus for germinating grain and the like and supplying germinating grain and water for feeding animals and fowl, a hopper having end and side walls and a converging sloping bottom leading downwardly from said side walls, a chute forming a downward continuation of said sloping bottom, a feeding trough disposed beneath said chute in grain and water receiving relation with respect thereto, means mounted between said side walls for supplying dry grain to said hopper comprising a plurality of hoppers arranged side by side, each having a converging bottom and a chute leading vertically therefrom and terminating at a selected grain level in said hopper, a series of water sprays extending along said hopper in the spaces between said dry grain supplying hoppers for spraying water on the grain in said germinating hopper to flow to said feeding trough, a plurality of heating elements disposed above the level of germinating grain in said hopper and extending along said hopper in the spaces between said grain supply hoppers, float means in said feeding trough controlling the supply of water through said spray tubes, and temperature sensitive means in said germinating hopper controlling the operation of said heating elements and the temperature of said hopper.

9. A grain germinating and feeding apparatus in accordance with claim 8 wherein the heating elements are infra-red lamps and wherein violet-ray lamps are disposed in association with the infra-red lamps.

10. The method of supplying conditioned grain for animal feeding comprising, introducing grain to a hopper, supplying water to the grain while in the hopper, inducing heat to the moistened grain and maintaining the temperature of the moistened grain in the hopper to a desired temperature to cause germination of the grain and dispensing the conditioned grain from the hopper to a feed trough positioned beneath the hopper.

11. The method of supplying conditioned grain for animal feeding comprising, introducing grain to a hopper, supplying water to the grain while in the hopper, heating the moistened grain while in the hopper to a desired temperature to cause germination of the grain and dispensing the conditioned grain from the hopper to a feed trough positioned beneath the hopper.

12. In an apparatus for germinating grain and supplying germinating grain and water for feeding animals and fowl, a hopper having end and side walls and a converging sloping bottom leading downwardly of said side walls, a chute forming a downward continuation of said side walls, a feeding trough disposed beneath said chute in grain and water receiving relation with respect thereto, there being a space beneath the bottom of said chute and the bottom of said feeding trough determining the depth of germinating grain in said feeding trough, means in said hopper and disposed above said sloping bottom for supplying water thereto and float means in said feeding trough controlling the supply of water to said hopper and determining the level of water in said feeding trough, heating means in said hopper maintaining the temperature of said hopper to a temperature conducive to the germination of grain comprising infra-red lamps extending along said hopper and spaced above the level of grain therein, and temperature sensitive means controlling said heating means and the temperature within said hopper.

13. In an apparatus for germinating grain and supplying germinating grain and water for feeding animals and fowl, a hopper having end and side walls and a converging sloping bottom leading downwardly of said side walls, a chute forming a downward continuation of said walls, a feeding trough disposed beneath said chute in grain and water receiving relation with respect thereto, there being a space beneath the bottom of said chute and the bottom of said feeding trough determining the depth of germinating grain in said feeding trough, means in said hopper and disposed above said sloping bottom for supplying water thereto and float means in said feeding trough controlling the supply of water to said hopper and determining the level of water in said feeding trough, heating means in said hopper maintaining the temperature of said hopper to a temperature conducive to the germination of grain comprising infra-red lamps extending along said hopper in spaced relation with respect to the level of grain therein and violet-ray lamps in association with said infra-red lamps, and temperature sensitive means controlling said heating means and the temperature within said hopper.

References Cited by the Examiner

UNITED STATES PATENTS

| 571,280 | 11/1896 | Nason | 119—53 |
| 576,777 | 2/1897 | Eitemiller | 119—73 |
| 2,530,597 | 11/1950 | Chandler | 119—51.5 |
| 2,766,725 | 10/1956 | Sievers | 119—51.5 |
| 2,974,634 | 3/1961 | Williams et al. | 119—52 |

FOREIGN PATENTS 1,070,440  12/1959  Germany.

SAMUEL KOREN, *Primary Examiner.*

HUGH R. CHAMBLEE, *Examiner.*